United States Patent

[11] 3,613,796

[72] Inventors David W. Cayton
Cupertino;
William G. Malley, San Jose, both of Calif.
[21] Appl. No. 49,415
[22] Filed June 24, 1970
[45] Patented Oct. 19, 1971
[73] Assignee FMC Corporation
San Jose, Calif.

[54] SELECTIVE SORT VINE CROP HARVESTER
26 Claims, 16 Drawing Figs.

[52] U.S. Cl. ..................................................... 171/27,
209/124
[51] Int. Cl. ..................................................... A01d 17/08
[50] Field of Search............................................ 171/14, 15,
18, 20, 21, 22, 27, 130; 209/122, 124; 198/84

[56] References Cited
UNITED STATES PATENTS
1,345,301 6/1920 Winchester .................. 198/84

3,252,520 5/1966 Hill et al. ..................... 171/14
3,473,613 10/1969 Boyce........................... 171/14

Primary Examiner—Antonio F. Guida
Attorneys—F. W. Anderson and C. E. Tripp

ABSTRACT: A mobile field tomato harvester picks up a mass of vines and some dirt with a double pair of weeder bars and conveys the mass to an initial shaker which detaches fruit and delivers it to a side sort culling station embodying a sorting reel. Before reaching the initial shaker, the mass passes over a gap where loose fruits and clods fall onto a loose-material-screening conveyor and are conveyed to a rear market fruit selection station which includes another sorting reel. At this reel, the market fruit is passed on to a market fruit conveyor and culls are automatically rejected. Resuming description of the vine flow, after leaving the initial shaker, the vines are turned over and reshaken on a second shaker. The fruit detached by the second shaker is delivered to the same screening conveyor that receives the loose material initially falling from the mass before the mass reaches the first shaker, as described above.

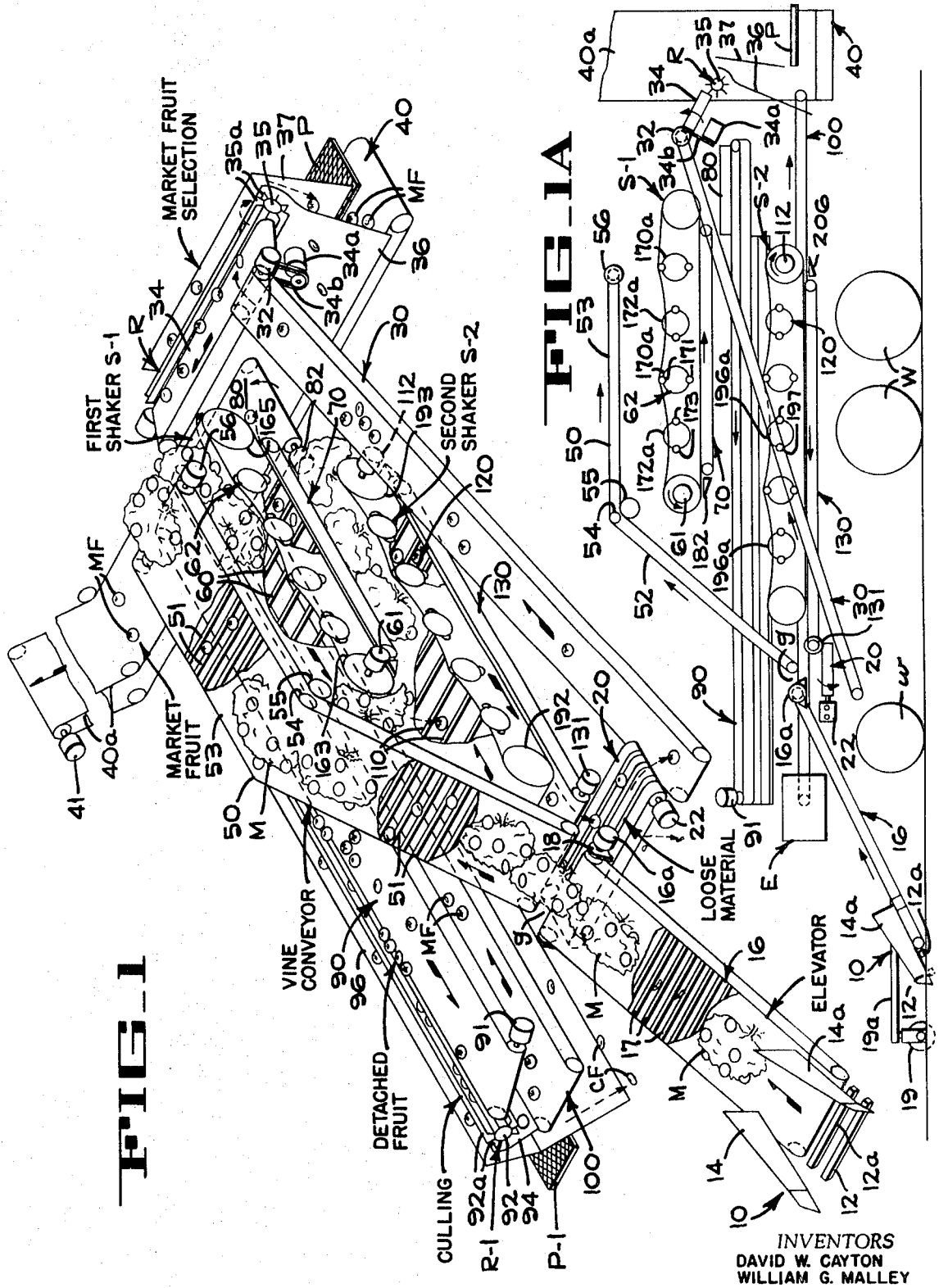

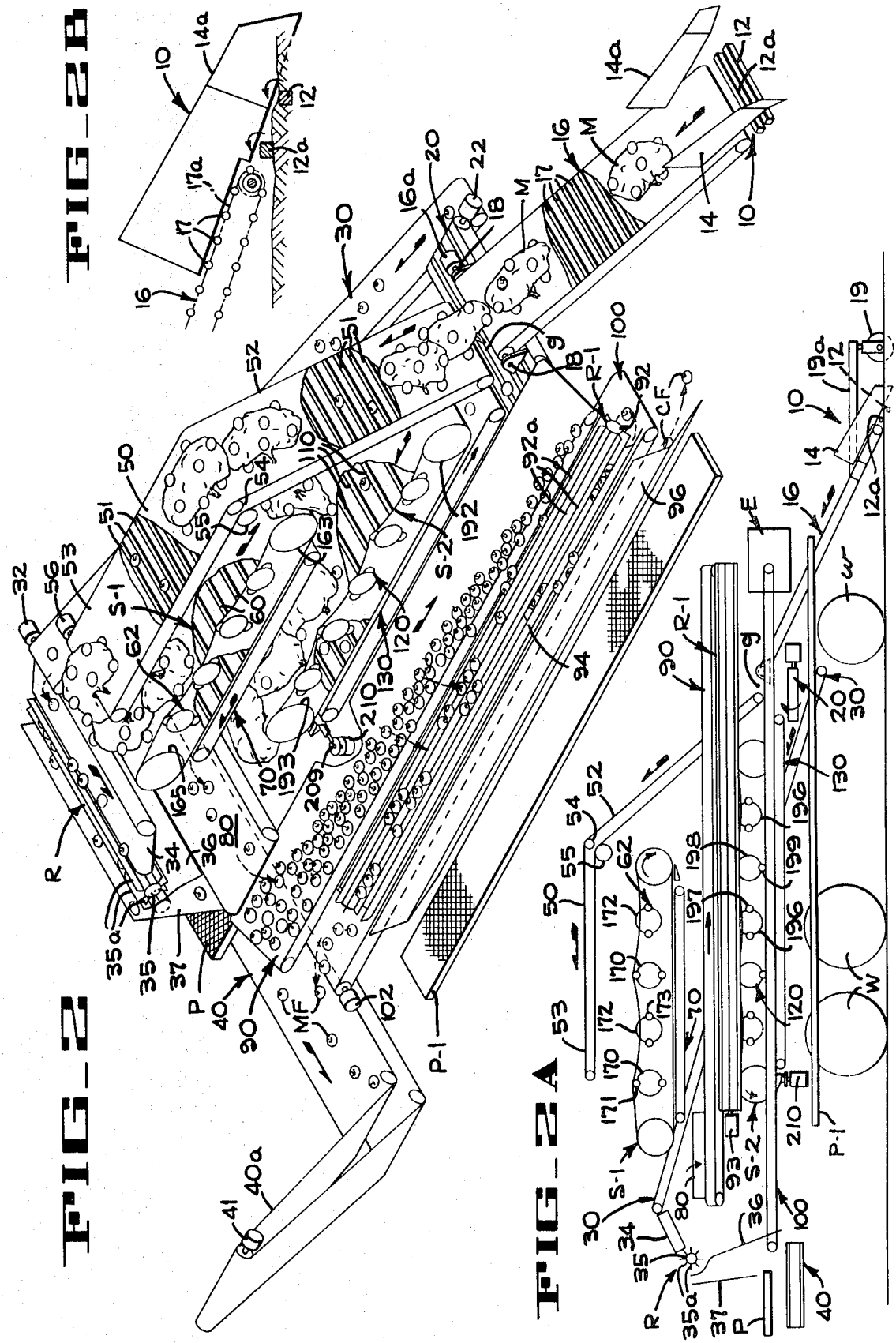

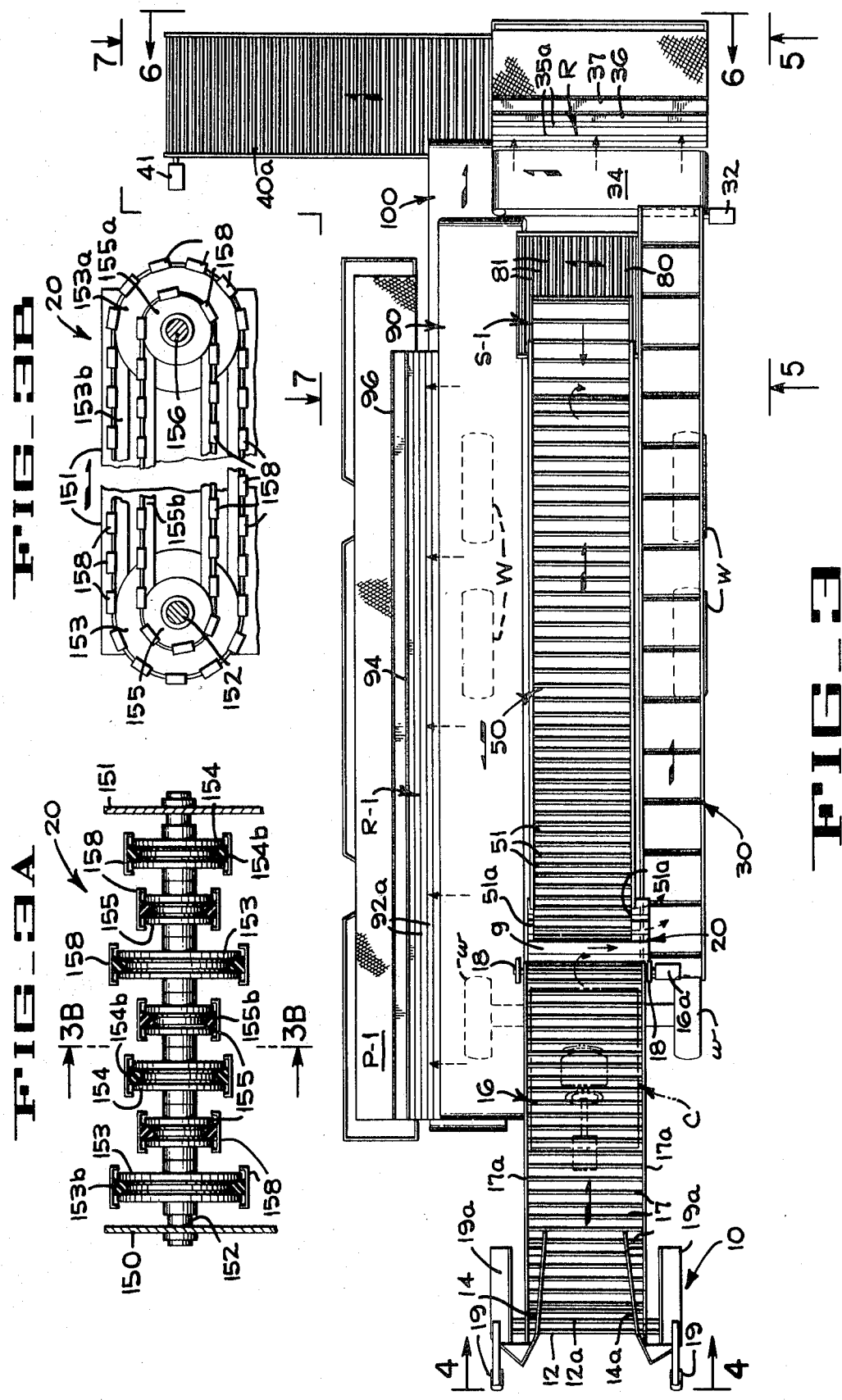

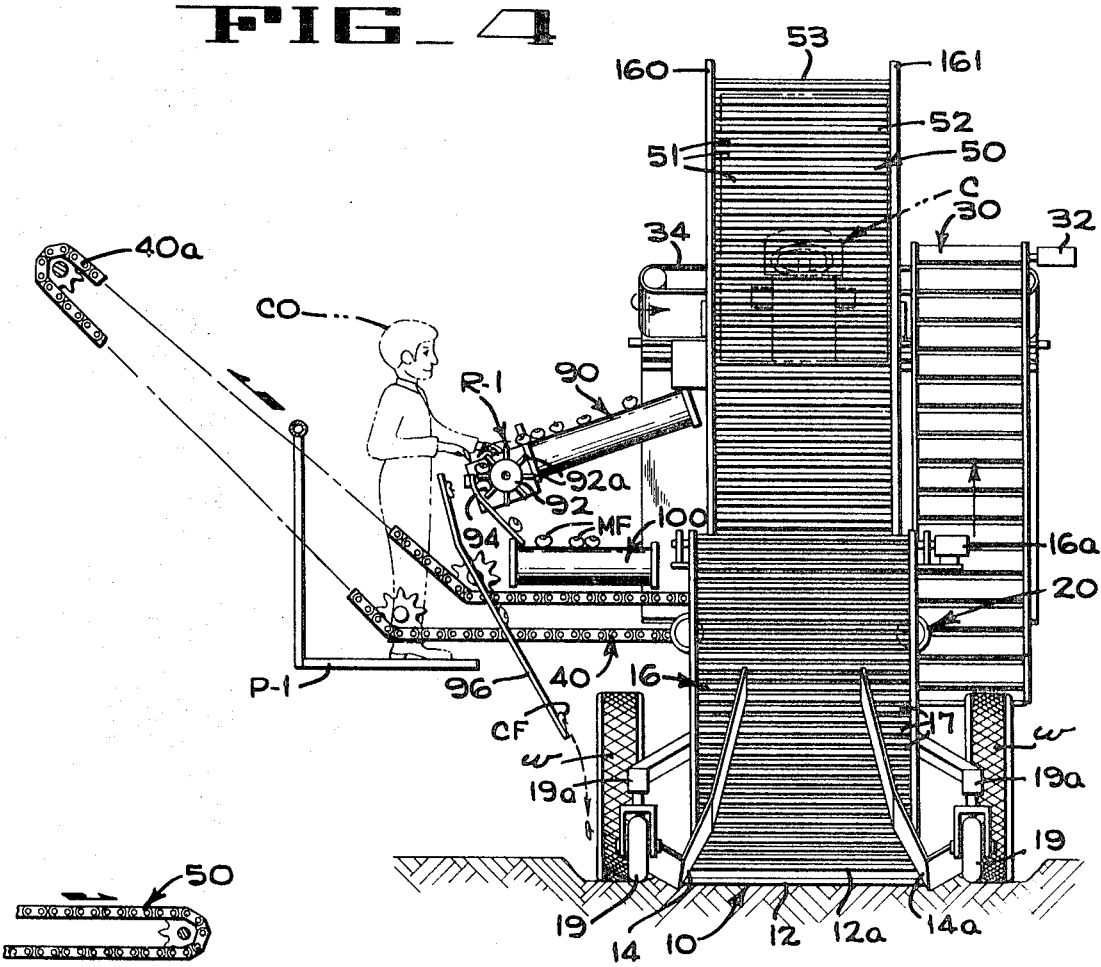
FIG_4
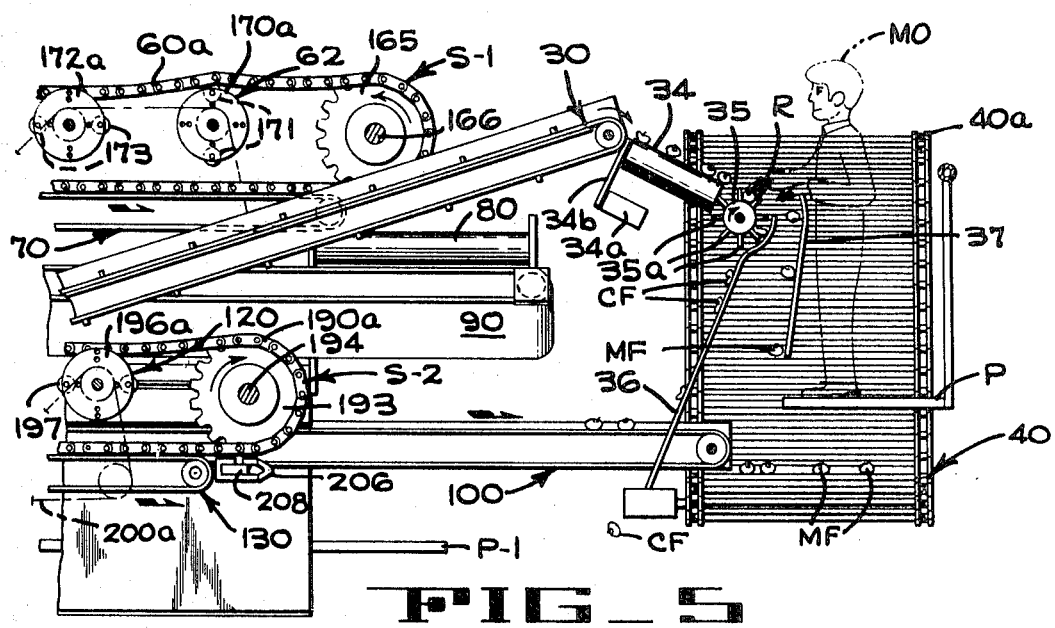
FIG_5

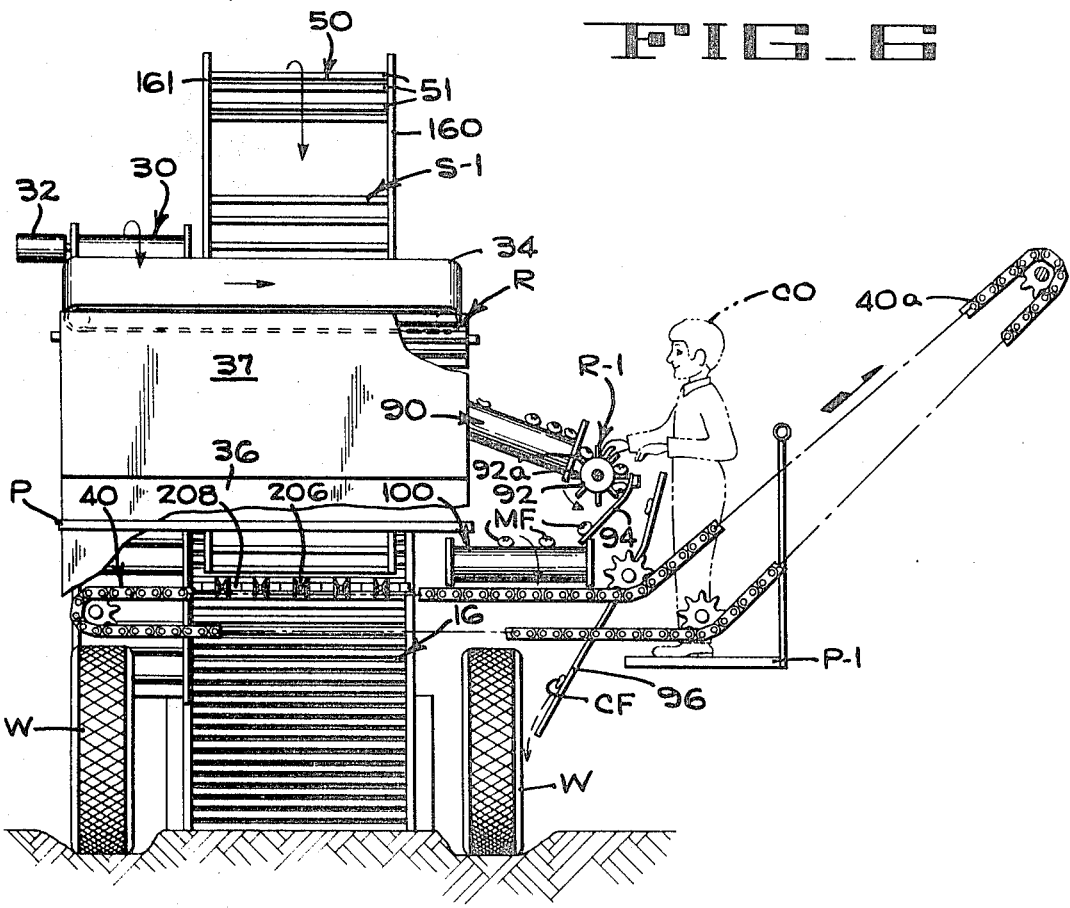
FIG_6
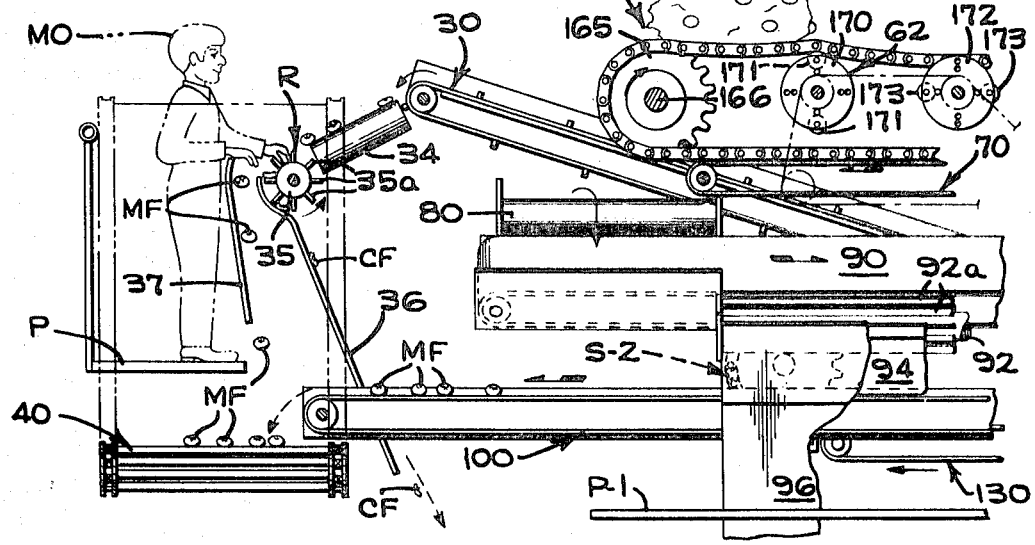
FIG_7

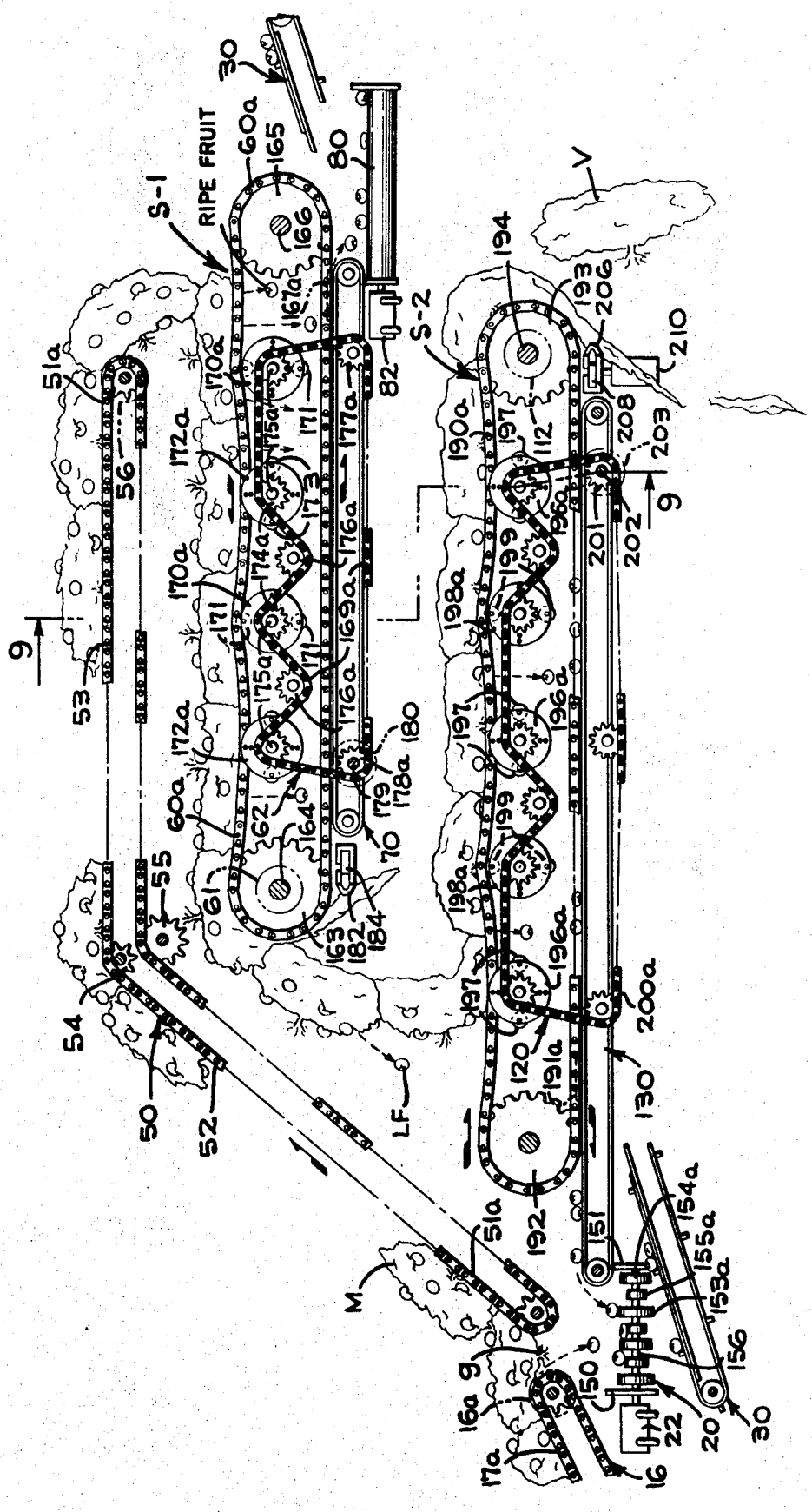

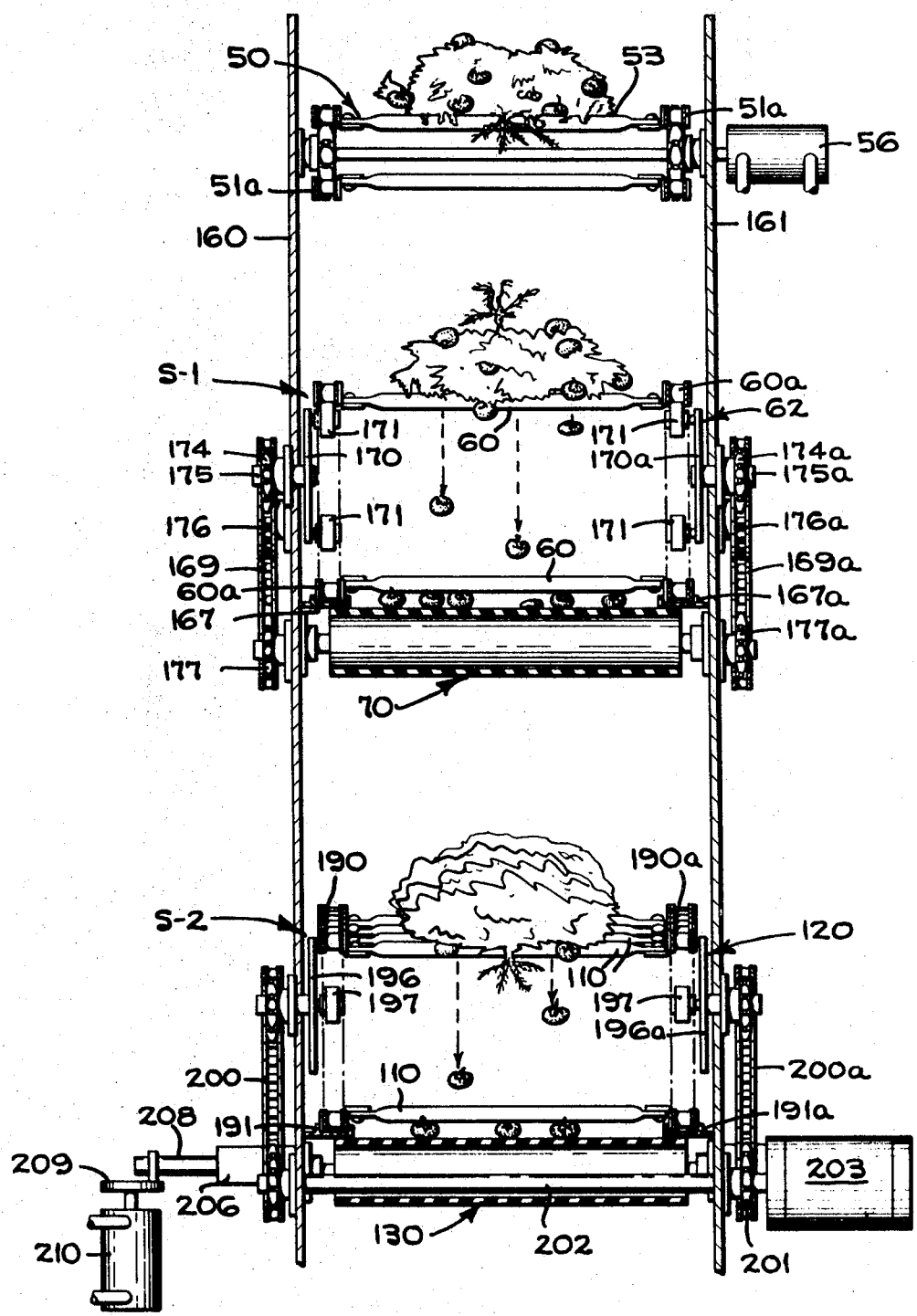
FIG_9

SELECTIVE SORT VINE CROP HARVESTER

REFERENCE TO RELATED APPLICATIONS

A sorting reel of the type employed in the present invention forms the subject matter of the U.S. pending application of Cayton, Ser. No. 39,199 filed May 21, 1970, assigned to the FMC Corporation.

A turnover shaker of the type disclosed herein forms the subject matter of the pending U.S. application of Dumanowski et al., Ser. No. 59,268 filed July 29, 1970, assigned to the FMC Corporation.

A loose-material-screening conveyor like that disclosed herein forms the subject matter of the U.S. application of Walker, Ser. No. 66,512 filed Aug. 24, 1970, assigned to the FMC Corporation.

A dual weeder bar and crowder plate pickup assembly like that embodied in the harvester of the present invention forms the subject matter of the U.S. application of Malley et al., Ser. No. 65,046 filed Aug. 19, 1970, assigned to the FMC Corporation.

FIELD OF THE INVENTION

This invention relates to harvesters and more particularly to a mobile field harvester for vine crops such as tomatoes or the like.

DESCRIPTION OF PRIOR ART

A tomato harvester which separates out loose dirt and clods from the mass before shaking, for separate sorting and for combining with materials sorted after having passed through the shaker is shown in the U.S. Pats. to Looker, No. 3,301,331, issued Jan. 31, 1967 and Csimma, No. 3,340,935, issued Sept. 12, 1967, both assigned to the FMC Corporation.

The U.S. Pats. to Rodin, No. 2,209,282, issued July 23, 1940, Pridy, No. 2,793,747 issued May 28, 1957 and No. 2,896,728 issued July 28, 1959 show potato harvesters having sorters disposed along belts running at the sides of the machine.

Dutch Pat. No. 56,132, issued Apr. 15, 1944 shows serially arranged fruit-separating conveyors running in the same direction.

Good, U.S. Pat. No. 2,457,156, Nov. 16, 1948 shows a peanut picker having superposed oscillating vine- and peanut-shaking bars.

SUMMARY OF THE INVENTION

The tomato harvester of the present invention, as compared to prior devices of this type, has the following improvements and advantages:

a. The weeder bars, by not cutting up the vines, introduce less loose trash into the system with the vines remaining easily disposable by the conveyors and shakers.

b. Rocks, clods, dirt and undersized fruit will be removed early in the progress of material through the harvester, thereby reducing sorting and handling problems that come later.

c. The mass picked up in the field is first conveyed to an initial or first shaker, the receiving end of which is at the rear of the machine, the shaker moving forwardly. The undershaker conveyor moves rearwardly and hence fruit that is first detached (which is usually the softest and most fragile fruit because it is usually the ripest) is removed to the culling conveyor system without being carried on along the remainder of the first shaker.

d. The mass leaving the first shaker is turned over and dropped onto a second shaker where the remainder of the fruit is removed. These, more tenaciously attached fruits, include the greener fruits. The undershaker conveyor for the second shaker runs forwardly and deposits the fruit thus detached onto the loose material screening and grading conveyor previously mentioned. This has two advantages:

1. Since the loose material is sorted in a manner in which culls are automatically dropped back to the ground, the green fruit is handled with the loose material and hence need not be handled by the sorters;
2. Since the green tomatoes are apt to be undersized, many of them fall out at the loose-material-screening conveyor and hence need not be examined by the sorters who select marker fruit from the remaining loose material.

e. Fruit leaving the first shaker that is on the mass and has been shaken loose of vine attachment but cannot work its way through the mass so that it remains on top, drops out clear of the mass directly onto the second shaker as the mass is tumbled from the first to the second shaker. This directs such fruit almost immediately to a collecting conveyor system before the fruit traverses the second shaker.

The above factors contribute in an interrelated manner to provide a harvester which has a higher output, can move faster down the rows, may employ fewer sorting operators and causes less damage to the fruit than prior commercial machines. These advantages are particularly important in tomato harvesters.

BRIEF DESCRIPTION OF THE DRAWINGS

FIG. 1 is a diagrammatic perspective of a harvester embodying the invention viewed from the front and left side thereof.

FIG. 1A is a diagrammatic side view showing the relative disposition of the major elements of the harvester.

FIG. 2 is a diagrammatic perspective like that of FIG. 1 viewed from the right front.

FIG. 2A is a diagram like that of FIG. 1A viewed from the right of the harvester.

FIG. 2B is an enlarged fragmentary diagram showing the preferred weeder bar pickup assembly.

FIG. 3 is a plan view of the harvester.

FIG. 3A is an enlarged section through the idler pulleys of the screening conveyor or dirt belt.

FIG. 3B is a central section taken along line 3B—3B of FIG. 3A.

FIG. 4 is a front view of the harvester as seen along lines 4—4 of FIG. 3.

FIG. 5 is a fragmentary side view of the rear portion of the harvester looking along line 5—5 of FIG. 3.

FIG. 6 is a rear view of the harvester looking along line 6—6 of FIG. 3.

FIG. 7 is a fragmentary side view of the rear portion of the harvester looking along line 7—7 of FIG. 3.

FIG. 8 is an enlarged side view of the turnover shaker assembly.

FIG. 9 is a section taken on line 9—9 of FIG. 8.

GENERAL DESCRIPTION OF THE HARVESTER

Introduction

Figure 11:
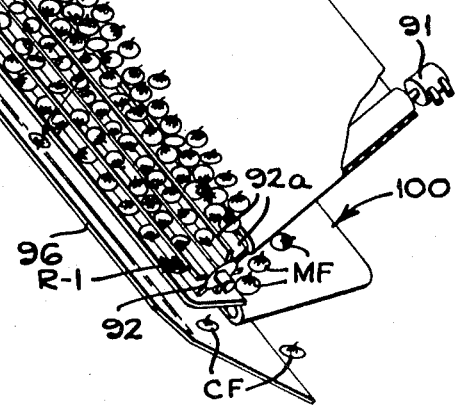
FIG. 11 is a section of the reel.

The general disposition and relationship of the principle parts of the harvester are best seen in the perspective diagrams of FIGS. 1 and 2, although the side and end views of the harvester show more accurately the geometrical relationships and dimensions of the various conveyors, etc. In order to more clearly disclose the invention conventional-type structured details have been omitted from the drawings. For example, frame elements which merely act as supports for various shafts, etc., are not shown in detail nor are the various individual bearings for the shafts, the mountings for the hydraulic motors, etc. In accordance with modern agricultural practice, the various individual conveying and other elements of the harvester are driven by their own hydraulic motors, the drives of course, being adjusted to produce the desired linear or rotational speeds of the driven elements. These motors are connected, in a usual and conventional manner to a centralized pump system which is operated by an engine or other prime mover of operated by a power takeoff from the harvester propulsion engine. A typical drive arrangement for a harvester of this type is disclosed in the U.S. Pat. to Boyce, No. 3,473,613, issued Oct. 21, 1969, and the harvester of the present invention employing the mechanical drive principles shown in this patent.

Material Flow—General

Referring to FIGS. 1–7 and relying principally on the perspective of FIGS. 1 and 2, the principle material handling elements of the harvester will now be described. At the outset, it will be noted that the harvester embodies a split flow or selective arrangement. An initial mass M of vine-attached tomatoes, loose tomato clods and some dirt is picked up from the field by a digger mechanism 10 and carried over to an elevator conveyor 16.

The loose material falls through a gap "g" onto a screening conveyor 20 and is subjected to separate inspection and sorting operation, at a rear sorting reel R. Here the culls drop automatically to the ground and the market fruit is transferred manually to a collection conveyor 40. The remaining mass M of vines and attached fruit continues on to a double or turnover shaker operation. Fruit is detached by a first shaker S–1 and subjected to a separate culling operation. Culls are manually removed at a side sort reel R–I and the market fruit automatically passes on to the collection conveyor 40 via a conveyor 100.

The vines are turned over and the remaining fruit is detached by a second stage shaker S–2. The fruit thus detached is introduced by a conveyor 130 into the separate loose material inspection system at the conveyor 20, previously mentioned. Thus, the fruit from the first stage shaker, after having been presented for culling at the reel R–1, is combined with the loose fruit (including that from the second shaker) after the loose fruit has been automatically culled at the reel R, for delivery by a conveyor 40 to a truck or trailer that moves along the field alongside of the harvester.

Pickup Details

The harvester is driven by an internal combustion engine E (FIGS. 1A and 2A) and is supported on front steering wheels w and tandem rear drive wheels W. The engine supplies power for the hydraulic pumps, etc. (not shown) for the hydraulic motors. The controls are in a cab C.

As the harvester moves down along a row of tomatoes or the like, a pickup mechanism indicated generally at 10 removes the vine-attached tomatoes and loose tomatoes from the ground and delivers the mass M (with some dirt and clods) to the harvester. In the embodiment of the invention being illustrated, a pair of rotating weeder bars 12, 12a operate to uproot the vines and transmit them rearwardly. These bars are flanked by rearwardly extending crowder plates, 14, 14a for shaping the mounds of soil and providing an efficient pickup, as disclosed in the aforesaid U.S. Pat. application of Malley et al., Ser. No. 65,046.

The weeder bars and crowder plates are mounted on side frame elements (not shown completely for clarity) which also support the elevator conveyor indicated generally at 16. This conveyor is made up of moving slats 17, mounted on side chains 17a (FIG. 8) that pass over idler and driving sprockets in accordance with conventional practice in this art. Details of the sprocket and drive chain constructions and the mounting of the various conveyor elements in the harvester are not shown in detail herein. Typical designs suited for use in the present are shown in the aforesaid application of Boyce, now U.S. Pat. No. 3,473,613, (hydraulic motor drives) and in the aforesaid U.S. Pats. to Csimma, No. 3,340,935 and Looker, No. 3,301,331, (mechanical drives).

In the embodiment shown, the pickup conveyor 16 is driven by hydraulic motor 16a (FIG. 1) and is pivotally mounted on the frame at 18 about the axis of the drive. This permits the pickup elevator and the pickup assembly 10 including the weeder bars 12, 12a to follow the contour of the ground in accordance with the setting of front caster gauge wheels 19. (FIGS. 1A, 2A and 3) which are swivelly mounted on the pickup conveyor frame by means of forwardly projecting arms 19a. The arms 19a are supported at their rearward end from the side frame structure of the pickup and elevator conveyor 16.

Loose Material Handling

As the mass M of vines and fruit, etc., leaves the delivery end of the conveyor 16, it must pass over a gap "g" (best seen in FIG. 8) leading to the screening conveyor 20, briefly mentioned above. Loose fruit and clods of dirt fall by gravity onto the loose-material-screening conveyor 20, which is sometimes referred to in the art as a "dirt belt." This conveyor comprises a series of belts running in different vertical planes (FIGS. 3A and 3B) driven by a hydraulic motor 22 (FIG. 1). The conveyor 20 discharges tomatoes and large clods that remain along the left side of the machine (FIG. 1). The upper end of the loose material conveyor 30 is driven by a hydraulic motor 32 (FIG. 1A) and deposits the loose fruit and clods onto a laterally running, rearwardly inclined distribution conveyor 34. The conveyor 34 is driven by a hydraulic motor 34a (FIGS. 1 and 5) and a chain and sprocket assembly 34b in accordance with conventional engineering practices.

The conveyor 34 is inclined toward the market fruit selection reel R previously mentioned, and distributes the fruit along the length of the reel. The reel R has a rotating hub 35 and flight bars 35a (FIG. 5) which pick up fruit from the distribution conveyor 34 one row at a time, and present successive rows for sorting. The fruit thus picked up in rows by the reel is presented to the sorting operators MO (FIG. 5). These operators stand on a rear platform P.

Here the market fruit is flicked out of the reel R by the operators, but the culls CF and clods are left in the reel to be dropped along a deflector chute 36 onto the ground. FIGS. 1 and 5 show the culls indicated at CF (and clods) falling to the ground.

The market fruit MF, which is flicked out of the reel R by the market-fruit-sorting operator MO drops between the chute 36 and a vertical guide plate 37, and falls onto the laterally running market fruit conveyor 40. The latter is driven by a hydraulic motor 41 (FIGS. 1 and 2). The market fruit is elevated by a section 40a of the market fruit conveyor for delivery to a truck, trailer or the like as previously described. The above description outlines the handling of loose fruit and clods that do not reach the shaker section of the harvester.

Initial Shaking

Returning to the handling of the mass of vines and attached fruit, this mass that bridges the gap "g" at the delivery end of the elevator conveyor 16 is picked up by a vine conveyor 50 formed with slats 51 mounted between side chains 51a (FIGS. 8 and 9) in a manner conventional in this art. The vine conveyor 50 has an elevating section 52 and a generally horizontal section 53 that runs over the shaker section of the machine. The change in direction of the two conveyor sections 52, 53 is effected by idler sprockets 54, 55 that engage the conveyor side chains. The conveyor 50 is driven by a hydraulic motor 56 (FIG. 1) and the rearwardly disposed delivery end of the conveyor drops the vines and attached fruit onto the initial shaker conveyor S–1 (as best seen in FIG. 8).

The shaker conveyor S–1 is formed of moving slats or flight bars 60 mounted between chains 60a (FIG. 8). The flights 60 are spaced apart a distance that exceeds the spacing of the slats 51 on the elevating conveyor 50, in order that tomatoes shaken loose or dislodged from the mass of vines can pass between the shaker slats. Additional details of the structure of the shaker conveyor will be described presently in connection with FIGS. 8 and 9. The upper reach of the shaker conveyor S–1 is driven forwardly of the machine by a hydraulic motor 61. (FIG 1). The upper reach of the shaker conveyor S–1 is also vertically vibrated by a rotating kicker bar assembly indicated generally at 62, also to be described in detail presently. The initial shaker conveyor S–1 and the shaker S–2 that runs beneath it are described in detail and claimed in the aforesaid copending U.S. Pat. application of Dumanowski et al. Ser. No. 59,268.

Beneath the lower reach of the initial shaker conveyor S-1 is an undershaker conveyor indicated generally at 70, which receives detached fruit passing between the slats 60 of the shaker, carries that fruit rearwardly and drops it onto a transversely running, rearwardly disposed collecting conveyor 80. This conveyor is formed of slats 81 (FIG. 3) running in side chains (not shown) and passing over sprockets in the conventional manner. The collecting conveyor 80 is driven by hydraulic motor 82 (FIG. 1). The collecting conveyor 80 drops the fruit shaken from the vines by the shaker S-1 (which will include most of the ripe fruit), onto a forwardly running, laterally inclined distribution conveyor 90 (FIG. 2) running along the right side of the machine. This conveyor is driven by a hydraulic motor 91 (FIG. 1).

Figure 10:
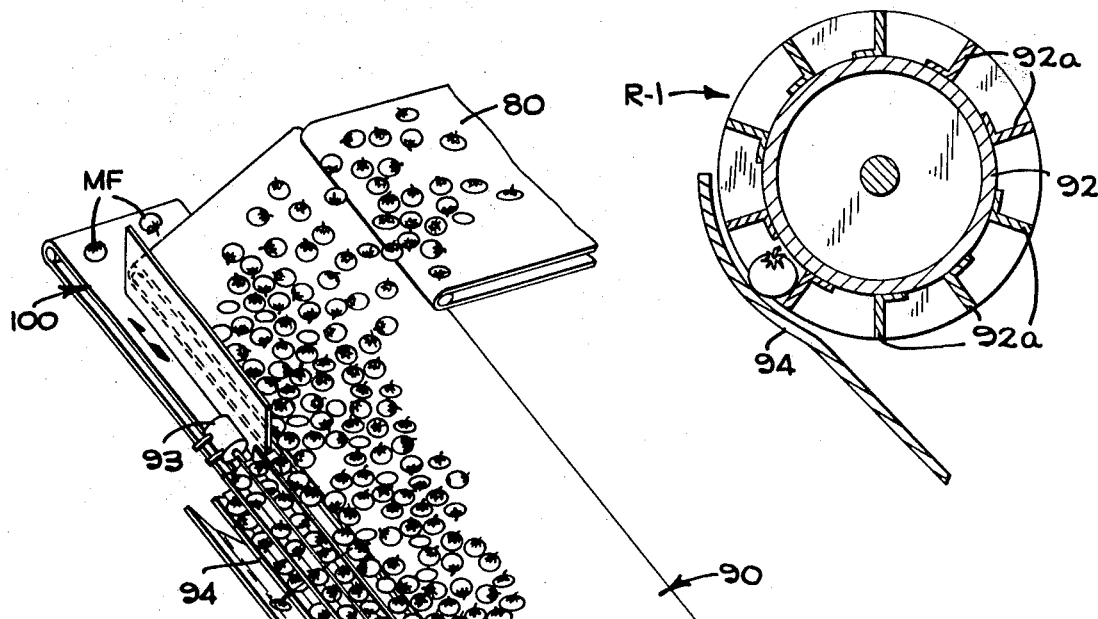
FIG. 10 is a diagrammatic perspective of the culling reel sorting assembly.

The distribution conveyor 90 is laterally inclined toward the side sorting reel R-1 (FIGS. 4 and 10) which picks up the fruit distributed from the distribution conveyor 90 in rows and presents it to culling operators CO (FIGS. 4 and 6), standing on a platform P-1. The reel R-1 has flight bars 92a (FIG. 11) mounted on a rotating hub 92, similar to those of the reel R previously described. The reel R-1 is driven at one end by a hydraulic motor 93 (FIGS. 2A and 10).

Fruit that is not selected by the culling operator CO remains in the reel and is dropped off by a confining guide 94, this being the market fruit MF detached from the vines. The market fruit falls onto a rearwardly running collector conveyor 100 driven by a hydraulic motor 102 (FIG. 2), for delivery to the market fruit conveyor 40, previously described (FIG. 2).

The cull fruit CF, flicked out from the reel R-1 by the culling operators CO, is guided by a drop plate or chute 96 and falls to the ground (FIGS. 4 and 6).

Thus it can be seen that the fruit detached from the initial shaker conveyor S-1 is directed (conveyors 70, 80 and 90) in front of culling operator CO for the removal of culls (reel R-1) and is hence put into the market fruit collection system (conveyors 100 and 40) without having traversed the second shaker conveyor S-2.

Second Shaking

Returning to the first or initial shaker conveyor S-1, vines and fruit that remain attached to the vines are dropped off the forward end of the shaker S-1 onto the forward end of the underlying shaker S-2 which runs in a direction opposite to that of the first shaker. The mass of vines and fruit is thus turned over during this transfer action (FIG. 8).

Also, some fruit will have been detached from the vines on the first shaker S-1 but will not have worked its way down through the mass on the first shaker and hence will be on or near the top of the mass as the latter tumbles onto the second shaker. Such fruit, indicated at LF in FIG. 8, drops clear of the mass and falls through the second shaker before traversing it, and hence enters the collection system almost immediately.

As in the case of the shaker S-1, the shaker S-2 is formed of widely spaced slats 110 which are driven rearwardly of the machine FIGS. 1, 2 and 8) by a hydraulic motor 112 (FIG. 1). A kicker bar assembly indicated generally at 120 vertically oscillates the upper reach of the shaker conveyors S-2, to provide the shaking action in a manner similar to that of the kicker bar assembly 62 associated with the upper shaker conveyor. As mentioned, the turnover shaker assembly per se forms the subject matter of the U.S. Pat. application of Dumanowski et al., Ser. No. 39,199, filed May 21, 1970.

The fruit detached by the lower shaker conveyor S-2 (which will include most of the green and hence undersized fruit) falls onto the undershaker conveyor 130 driven by a hydraulic motor 131. The upper reach of the conveyor 130 moves forwardly of the machine and deposits the detached fruit onto the screening conveyor or dirt belt 20 (FIGS. 1 and 8). Thus, green and undersized green fruit removed by the second shaker S-2 is put into a sorting system wherein the culls are automatically rejected and only the market fruit need be manually handled. This is the market-fruit-sorting reel R at the rear of the harvester and previously described.

Having completed a detailed description of the flow through the harvester, some of the details of certain harvester elements will now be amplified.

Screening Conveyor

The screening conveyor 20 receives loose fruit that is dropped off in the gap "g" between the pickup conveyor 16 and the elevator conveyor 50 along with clods, etc., as well as fruit from the conveyor 130 that has been shaken loose on the second shaker conveyor S-2, (see FIG. 8). The screening conveyor 20 not only sifts out dirt and clods, but tumbles the mass, breaks up clods and sifts out undersized (often green) fruit.

FIG. 3A is a section at the idler shaft of the screening conveyor and FIG. 3B is a longitudinal section looking along the line 3B of FIG. 3A. The screening conveyor 20 is mounted between side plates 150 and 151 supported on the adjacent portion of the harvester frame (not shown). These plates support the idler shaft 152 upon which pulleys of various sizes are mounted for independent rotation. Thus, as seen in FIG. 3A, the idler shaft 152 mounts two large diameter pulleys 153, two intermediate diameter pulleys 154 and three small diameter pulleys 155. These pulleys have their counterparts 153a, b andc on the driven shaft 156 (FIG. 3B) but the latter are keyed or pinned to their shaft. Thus, when the shaft 156 is driven by the hydraulic motor 22 (FIG. 1) previously mentioned, the pulleys 153a, 154a and 155a all rotate together.

Trained over the large pulleys 153, 153a are V-belts 153b. Trained over the intermediate pulleys 154, 154a are V-belts 154b and V-belts 155b are trained over the smallest pulleys 155, 155a. Thus, when the shaft 156 is driven, the V-belts just described advance at different linear speeds. U-shaped cleats 158 are riveted at spaced intervals along each of the belts and project laterally past the belts and their pulleys. These cleats provide side diggers for working on the mass, breaking up clods, and tumbling the mass.

As seen in FIG. 3B, not only do adjacent belts run at different linear speeds but the upper reaches of adjacent belts are at different elevations. This provides troughs for receiving the mass of loose materials dropped on the screening conveyor and accordingly presents side faces of the material for the tumbling and breaking action of the cleats 158, as mentioned above. The construction just described resembles that of the copending U.S. Pat. application of Walker, Ser. No. 66,512, filed Aug. 24, 1970, in its essential details and the aforesaid Walker construction can be substituted for that shown herein.

Shaker Conveyors

FIGS. 8 and 9 illustrate various details of the shaker conveyors S-1, S-2. The shaker conveyor assembly is mounted between side plates 160, 161 (FIG. 9) mounted on the associate elements of the harvester frame (not shown) in any convenient manner. The shaker S-1 has side chains 60a (previously mentioned) that are trained over drive pulleys 163 (one appearing in FIG. 8) mounted on a shaft 164 in the framework and driven by the motor 61 (FIG. 1). Chains 60a are also trained over idler pulleys 165 mounted on a shaft 166 in the framework. The upper reach of the chains 60a and the slats 60 move forwardly in the machine, as seen in FIG. 8. The chains at the lower reach of the upper shaker conveyor are supported on rails 167, 167a (FIG. 9) so that the flight bars 60 just clear the upper reach of the undershaker conveyor 70. This reduces wear of the parts as well as providing for slack in the upper reach for oscillation by the kicker bar assembly 62. These rails have been broken away in FIG. 8.

The undershaker conveyor 70 is driven at the same linear speed as that of the conveyor S-1. Thus fruit shaken from the mass of vines and attached fruit on the upper reach of the shaker conveyor S-1 falls between the shaker slats 51 down onto the upper reach of the shaker conveyor 70 and is carried along the undershaker conveyor at the same speed as that of the slats 51 of the lower reach of the shaker conveyor S-1. As seen in FIG. 8, this fruit is discharged by the undershaker conveyor 70 to the laterally running collector conveyor 80.

It can also be seen at the upper right of FIG. 8 how the mass of vines and fruit that are deposited from the delivery end of the horizontal reach 53 of the conveyor 50 drops onto the rear end of the shaker conveyor S–1, which end is close to the collector conveyor 80. Thus ripe fruit (which is most likely shaken off first) or fruit that is so ripe that it has been detached by handling up to this point, falls through the shaker conveyor S–1 and down onto the lower reach of the undershaker 70 at the delivery end of the latter. This deposits ripe fruit onto the collector conveyor 80 almost immediately, and hence minimizes handling of the very fruit that is the most fragile.

As previously mentioned, in order to provide the shaking action required for the upper reach of the shaker conveyor S–1, the kicker bar assembly 62 is provided. As seen in FIG. 8, the kicker bar assembly comprises two pairs of opposed, rotating discs 170, 170a (one pair appearing in FIG. 9), each of which mounts a pair of kicker rollers 171. In the position of the discs illustrated in the drawings, the rollers 171 (which are diametrically opposed) are disposed in the vertical plane. Adjacent the two pairs of discs 170, 170a are two pairs of discs 172, 172a (FIG. 8) having kicker rollers 173, but these rollers in the position illustrated in FIG. 8 are in the horizontal plane, that is, in a plane at 90° to the plane containing the kicker rollers 171. Thus, synchronous rotation of the disc-mounted rollers will produce an undulating or sinusoidal vibration of the upper reach of the shaker conveyor. The discs 170, 170a and 172, 172a are simultaneously rotated by drive chains 169, 169a which are trained over sprockets 174, 174a on corresponding stub shafts 175, 175a that mount the roller discs. Idler sprockets 176, 176a are disposed between some of the discs for improving the drive. Also provided is a lower rear set of idler sprockets 177, 177a and drive sprockets 178, 178a mounted on a drive shaft 179, (FIG. 8). The shaft 179 for the drive sprockets 178, 178a is driven by a hydraulic motor 180 shown in phantom in FIG. 8.

As mentioned, since the lower reach of the shaker conveyor S–1 has its side chains supported on rails 167, 167a (FIG. 9), this makes it possible to provide ample slack in the upper reach of the conveyor chains. As a result, the sinuous oscillation imparted to the chains for detaching fruit, is accomplished without unduly tensioning and wearing the chain links.

In order to prevent vines that tumble off the delivery (forward) end of the shaker conveyor S–1 from wrapping around that conveyor instead of falling onto the lower conveyor shaker S–2, a sickle bar assembly is provided. This assembly comprises stationary knife blade 182 and a reciprocating knife blade 184 (FIG. 8), the latter being reciprocated by a hydraulic motor, and an eccentric drive arrangement (not shown), in accordance with conventional sickle bar practice.

The lower shaker conveyor S–2 has a construction similar to that of the upper shaker conveyor, except that the parts run in the opposite direction and are displaced forwardly relative to the upper shaker. The lower shaker conveyor includes side chains 190, 190a connected by the slats 110 previously described and spaced along chains in the manner of the flights 60 of the upper conveyor. The chains 190, 190a at the lower reach of the conveyor are supported on rails 191, 191a (FIG. 9) as in the case of the upper shaker conveyor. The conveyor chains 190, 190a run over idler pulleys 192 (one appearing in FIG. 8) and driving pulleys 193 mounted on a shaft 194 driven by the hydraulic motor 112 (FIG. 1), previously described. The lower reach of the shaker conveyor S–2 runs at the same speed as the upper reach of the undershaker conveyor 130, for moving fruit along the latter conveyor for deposit upon the screening conveyor 20 as previously described.

The kicker bar assembly 120 for the lower shaker conveyors is substantially the same as the assembly 62 just described and hence will be only mentioned briefly. Since the lower shaker conveyor is somewhat longer, its upper reach is supported by five roller-mounting discs, including three pairs of discs 196, 196a having rollers 197 disposed in the horizontal plane in the position illustrated in FIG. 8, and intermediate discs 198, 198a with rollers 199 disposed at 90° to the other rollers, that is, in the vertical plane as shown in FIG. 8. The roller-mounting discs are rotated on stub shafts by chains 200, 200a which pass over idlers much in the manner of the assembly 62 just described. These chains are driven by drive sprockets 201, a drive shaft 202 and a hydraulic motor 203 (FIG. 9).

A sickle bar, including a fixed blade 206 and an oscillating blade 208 is mounted beneath the vine delivery end of the lower shaker S–2 (FIG. 8). As seen in FIG. 9, the movable sickle blade 208 is driven by an eccentric 209 and a hydraulic motor 210, this being the type of drive (not shown) provided for the upper sickle bar 182, 184 previously described.

As seen in FIG. 8, with the under shaker conveyors 70 and 130 being completely beneath and clear of their associated shaker conveyors, the shaft mountings, assembly and disassembly are simplified and the assembly is vertically compact. Also, the lower undershaker conveyor 130 can run forwardly past the lower shaker conveyor S–2 for delivery to the dirt belt 20, resulting in simplification of the conveyor system.

The operation of the shaker conveyors S–1, S–2 is as follows:

A mass of vines and attached fruit is carried rearwardly above the upper shaker S–1 by the horizontal section 53 of the elevator conveyor 50. As seen at the upper right of FIG. 8, this mass is dropped off onto the rearward, fruit-receiving end of the upper shaker conveyor S–1. The ripe and easily detached fruit are shaken clear almost immediately and hence fall through the upper reach of the shaker conveyor S–1 and onto the undershaker conveyor 70 at its delivery end. Hence this fruit reaches the collector conveyor 80 early in the first shaking cycle. As the mass of fruit and vines is carried forwardly on the upper reach of the shaker conveyor S–1 more fruit is detached, dropping through the slats or flights 60 onto the upper reach of the undershaker conveyor 70. This fruit is likewise deposited on the conveyor 80, as previously described.

During passage of the material along the upper reach of the shaker S–1, fruit resting on the top of the mass does not receive as effective a shaking action as that resting against the conveyor flights. However, as the mass is tumbled over the delivery end of the undershaker conveyor and falls onto the receiving end of the lower shaker conveyor, moving in the opposite direction, the effect is to turn the mass over. Now fruit that was formerly at the top of the mass will be adjacent its bottom. Thus, the fruits that were not previously directly accessible for shaking or were quite firmly attached, will be vigorously worked upon by the lower shaker conveyor S–2. Hence by the time the mass has reached the delivery end of the shaker S–2, almost all of the fruit that remained after the first shaking will have been detached and delivered to the undershaker conveyor 130. This will include a good percentage of the green fruit.

The vines V are dropped off of the rear end of the lower shaker conveyor S–2 and returned to the ground. As mentioned, the sickle bar assembly 206, 208 prevents wrap around of the vines at this point and so prevents their being picked up and carried to the screening conveyor 20 by the undershaker conveyor 30. Also, as previously mentioned, the fruit that is removed by the lower shaker conveyor S–2 tends to be the green or underripe fruit which also tends to be fruit of the smallest size. Since this fruit is delivered to the screening conveyor 20, the smaller fruit will be dropped off at the latter conveyor. If the green fruit is not small enough to be dropped out at the screening conveyor 20, it will be automatically dropped out by the reel R at the market fruit selection station, as was also explained in detail previously.

Typical Example

By way of example and in order to describe the best mode of operation of the invention now known, typical operating characteristics of the machine just described will be presented. When employed as a tomato harvester, the machine can move down a row of tomatoes at about 0.75 to 1.5 m.p.h., 1.25 m.p.h. being a typical speed.

Pickup conveyor 16—132 ft./min.

Elevator conveyor 50—70 ft./min.
Screening conveyor 20—80 ft./min. (average)
Distribution conveyor 34—870 ft./min.
Reels R and R-1—Peripheral speed of 25 ft./min.
Shaker conveyor S-1—linear speed—132 ft./min.
Kicker bar wheels and shakers—200 r.p.m.
Shaker conveyor S-2—linear speed—154 ft./min. Side sort distribution conveyor 90—70 ft./min.

Although the above-given exemplary operating characteristics are satisfactory for the field harvesting of tomatoes, it will be appreciated that these speeds are given by way of example only and that they can be adjusted to various field conditions, particularly when it is understood that most of the parts are driven by hydraulic motors, the speeds of which can be individually and independently controlled.

Operation

Although the operation of the various elements of the harvester of the present invention have been described in detail, the over all operation of the machine will now be summarized briefly.

As the machine advances down a row of tomatoes (for example) the weeder bars 12, 12a uproot the vines, lift them from the ground and bring them back to the pickup and elevator conveyor 16 with the assistance of the soil crowder plates 14, 14a. This feature per se forms the subject matter of the aforesaid copending U.S. Pat. application of Malley et al., Ser. No. 65,049, filed Aug. 19, 1970. Loose dirt is sifted out between the weeder bar 12a and the conveyor 16. More loose dirt drops out through the slats 17 of the conveyor 16.

The mass of vines, tomatoes, some loose dirt and clods pass over the gap "g" between the elevator conveyor 16 and the vine conveyor 50. The loose fruit and clods drop through the gap "g" (FIG. 8) onto the screening conveyor 20. As mentioned, much of the loose dirt will have been cleared at the weeder bars 12, 12a and more dirt will have dropped between the slats 17 of the conveyor 16. However, much of the remaining loose dirt will fall between the belts of the screening conveyor 20, as will undersized tomatoes and the smaller clods. Many of the larger clods will be broken up by the side attack action or the material by the screening conveyor, belts and cleats 158 (FIG. 3B) and these too will fall through.

The screening conveyor 20 deposits market size fruit (and possibly some clods) onto the side elevator conveyor 30 (FIGS. 1 and 8) which, in turn, discharges them onto the laterally running distribution conveyor 34 at the rear of the machine. Here, the fruit is picked up row by row by the flights 35a of the rear sorting reel R, in accordance with the copending U.S. Pat. application of Cayton, Ser. No. 39,199. Sorting operators MO stationed on the platform P (FIG. 5) flick out the market fruit MF, leaving the clods and culls to drop to the ground from the reel R. The market fruit MF thus selected is flicked in front of the chute 37 and falls onto the transversely running, rearwardly disposed market fruit conveyor 40.

The vines and attached fruit that bridge the gap "g" above the screening conveyor 20 (FIG. 8) are carried up by the elevating reach 52 and onto the horizontal reach 53 of the vine conveyor 50. This mass falls at the rear of the harvester onto the upper reach of the upper conveyor shaker S-1. Here, loose fruit is detached and dislodged from the mass of vines, the riper fruit falling out first and for deposit by the undershaker 70 onto the transverse collector conveyor 80. This action continues along the length of the upper shaker S-1 until, as seen in FIG. 8, the mass is dropped off the forward end of the upper shaker conveyor. The falling mass is tumbled over, so that fruit that was formerly on top of the mass will now be on its bottom as the mass is picked up by the upper reach of the lower shaker conveyor S-2. This action is assisted by the fact that the lower shaker conveyor runs in a direction opposite to that imparted to the mass by upper reach of the upper shaker conveyor S-1.

The fruit detached by the lower shaker conveyor S-2 falls between the upper slats 110 thereof and against the slats of the lower reach which move along with the upper reach of the undershaker conveyor 130. This fruit is most likely to contain green, small-sized fruit, although some ripe fruit will be included. The fruit detached from the lower shaker conveyor drops onto the screening conveyor 20 (FIG. 8) and hence is combined with the loose fruit that drops between the gap "g" of the pickup conveyor 16 and the elevator conveyor 50. Thus the fruit from the lower shaker is screened by the screening conveyor 30 along with the loose fruit from the pickup conveyor 16 to the rear sorting reel R, as previously described.

As described above, the lateral collecting conveyor 80 gathers the fruit shaken loose from the upper shaker conveyor S-1 and discharges onto a side-running distribution conveyor 90 which is inclined toward a second sorting reel R-1. Here, culling operators CO (FIGS. 4 and 6) flick out the culls, leaving the market fruit to be carried around by the reel for dropping onto the side-running collecting conveyor 100. This conveyor deposits the market fruit that was not culled out by the side-culling operators CO onto the market fruit conveyor 40 (FIG. 2) and hence combines it with the market fruit flicked out of the reel R by the market-fruit-sorting operators MO at that reel (FIGS. 5 and 7).

As has been mentioned previously, one of the characteristics of the machine of the present invention which renders it efficient and effective is its selective handling of the various types of fruits and materials picked up during the harvest. The rear sorting reel R is arranged so that material left in the reel (overripe and green fruit) passes automatically to the ground and the material flicked out of that reel by the market-fruit-sorting operator MO (FIG. 7) is market fruit. However, the material reaching this conveyor may contain a high percentage of culls, hence operation at the rear sorting reel R is efficient, in that the percentage of fruit that must be flicked out tends to be less than that automatically discharged to the ground.

On the other hand, the fruit that reaches the side sort reel R-1 tends to be predominantly market fruit, and as such is left in the reel for automatic combining with the market fruit flicked out of the reel R. At the side sort reel R-1, only culls and clods need be flicked out, and these are in the minority.

Although the best mode contemplated for carrying out the present invention has been herein shown and described, it will be apparent that modification and variation may be made without departing from what is regarded to be the subject matter of the invention.

What we claim is:

1. A mobile harvester for vine crops comprising means for picking up a mass of vines and fruit from the ground, means for initially separating out loose fruit from the mass, first shaker conveyor means for detaching attached fruit from the mass, second shaker conveyor means for receiving the mass from said first shaker conveyor means and detaching more fruit therefrom, means for combining the fruit detached by said second conveyor means with the loose fruit initially separated out from the mass, means for sorting market fruit from said combined loose and detached fruits, means for sorting culls from the fruit detached by said first shaker conveyor means, and means for combining the market fruit sorted from said combined fruits with the fruit from said second shaker conveyor means that remains after culling.

2. The harvester of claim 1, said means for sorting market fruit from said combined loose and detached fruits comprising an elongate rotary reel that presents all fruit for sorting and automatically delivers culls and clods to the ground.

3. The harvester of claim 1, said means for sorting culls from the fruit detached by said first shaker conveyor means comprising an elongate rotary reel that presents all fruit for culling and automatically delivers the nonculled fruit for combination with that sorted out at said first named reel.

4. The harvester of claim 1, wherein said first shaker conveyor means is above said second shaker conveyor means and the vines are turned over as they fall onto the second conveyor means, said shaker conveyor means running in opposite directions.

5. A mobile tomato harvester comprising means for picking up a mass of severed vines with attached fruit and loose material including loose fruit and some dirt, elevator conveyor means for the mass, vine conveyor means spaced from said elevator conveyor means for receiving the vines and attached fruit while allowing the loose material such as loose fruit and clods to fall out between said elevator and vine conveyor means, loose-material-conveying means for receiving the falling loose material; a market fruit selection station along said loose-material-conveying means including means for presenting the loose material for market fruit selection, market-fruit-conveying means for receiving the selected market fruit; first shaker conveying means for receiving the vines and attached fruit from said vine conveyor means and shaking fruit from the vines, detached-fruit-conveying means for receiving fruit from said first shaker conveying means and delivering it to said market fruit conveyor means, a culling station along said detached-fruit-conveying means including means for presenting the detached fruit for culling; second shaker conveying means for receiving vines with fruit still attached from said first shaker conveying means, and means for delivering fruit detached at said second shaker conveying means to said loose-material-conveying means for sorting at said market fruit selection station.

6. The harvester of claim 5, wherein said market fruit selection station and the associated loose-material-conveying means run laterally across the rear of the harvester.

7. The harvester of claim 5, wherein said loose-material-conveying means includes means for sifting dirt and small fruit to the ground.

8. The harvester of claim 5, wherein said pickup means comprises vine-severing means spaced forwardly of said elevator conveyor means for discharging some loose dirt ahead of said elevator conveyor means.

9. The harvester of claim 5, wherein the shaker portion of said first shaker conveyor means runs forwardly of the harvester and said vine conveyor means delivers the vines and attached fruit to the rear of said shaker portion.

10. The harvester of claim 9, wherein a conveyor portion of said first shaker conveyor means runs rearwardly of the harvester for delivering detached fruit to said detached-fruit-conveying means.

11. The harvester of claim 10, wherein the shaker portion of said second conveyor means runs rearwardly of the harvester for delivering vines to the ground and a conveyor portion thereof runs forwardly of the machine for delivering fruit detached to said loose-material-conveying means.

12. The harvester of claim 11, wherein the portion of said loose-material-conveying means that receives loose material from between conveyors also receives the detached fruit delivered from said second shaker conveying means.

13. A mobile field tomato harvester comprising means for severing the vines, elevator conveyor means for picking up a mass of vines with attached fruit, loose fruit and dirt, means for separating out loose fruit and dirt from the mass, shaker means for initially detaching vine-attached fruit from the remainder of the mass, means providing a culling station, conveyor means for delivering the fruit detached by said initial shaker means to said culling station, means for turning over and reshaking the mass remaining after said initial shaking, conveyor means for collecting the reshaken detached fruit along with the loose fruit and dirt first separated from the mass, a market fruit selection station, conveyor means for delivering the collected loose fruit and reshaken fruit to said market fruit selection station, and conveyor means for recombining market fruit obtained from said culling station with that obtained said market fruit selection station.

14. The harvester of claim 13, wherein said conveyor means for collecting the loose fruit, dirt and reshaken fruit includes screening means to eliminate dirt and undersized fruit from the collection before the fruit is delivered to said market fruit selection station.

15. The harvester of claim 13, wherein said means for initially shaking the mass comprises an initial shaker conveyor that moves forwardly of the harvester, an undershaker conveyor that moves rearwardly and delivers fruit to said culling station conveyor means, said elevator conveyor means delivering the mass to the rearward end of said initial shaker conveyor.

16. A mobile harvester for vine crops comprising means forward of the harvester for picking up a mass of vines and fuit, vine conveyor means for elevating the mass and carrying it rearwardly of the harvester, a shaker assembly comprising a shaker conveyor running forwardly of the harvester and with its receiving end disposed beneath the rearward, delivery end of said vine conveyor means, a detached fruit collector conveyor adjacent the vine-mass-receiving receiving end of said shaker conveyor, undershaker conveyor means running rearwardly of the harvester for delivering fruit detached by said shaker conveyor to said collector conveyor, and means for delivering detached fruit on said collector conveyor to a sorting station.

17. The harvester of claim 16, comprising a second shaker conveyor with its receiving end disposed beneath the delivery end of said first-named shaker conveyor and running rearwardly of the harvester, a loose fruit conveyor adjacent the receiving end of said second shaker conveyor, undershaker conveyor means running forwardly of the harvester for delivering fruit detached by said second shaker conveyor to said loose fruit conveyor, means for delivering the loose fruit to a second sorting station, and means for combining fruit from both sorting stations.

18. The harvester of claim 17, wherein said first-named sorting station comprises means for automatically discharging market fruit to said fruit combining means, and said second named sorting station comprising means for automatically discharging cull fruit to the ground.

19 A harvester for vine crops or the like, comprising means for picking up a mass of vines and fruit from the field, elevator conveyor means for the mass comprising an inclined rearwardly running section and an upper, generally horizontal and rearwardly running section, superposed shaker conveyors beneath said sections, an undershaker conveyor for each shaker conveyor, the undershaker conveyor for the lower shaker conveyor running forwardly beneath and projecting forwardly past the lower reach of the lower shaker conveyor, and a collection conveyor at the delivery end of each undershaker conveyor.

20. The harvester of claim 19, wherein the receiving end lower shaker conveyor is offset forwardly of delivery end of the upper shaker conveyor.

21. The harvester of claim 19, wherein the horizontal section of said elevator conveyor means overlies substantially the full length of said upper shaker conveyor.

22. The method of field harvesting vine crops comprising the steps of severing the vines, picking up a mass of vines and fruit, initially shaking vine-attached fruit from the mass, delivering the initially shaken fruit to a culling station, reshaking the mass to remove additional fruit, collecting the reshaken fruit and delivering it to a market fruit selection station, and combining market fruit obtained from said culling station with that obtained from said market fruit selection station.

23. The method of field harvesting vine crops comprising the steps of severing the vines, picking up a mass of vines with attached fruit, loose fruit and dirt, separating out loose fruit and dirt from the mass, initially shaking vine-attached fruit from the remainder of the mass, delivering the initially shaken fruit to a culling station, reshaking the mass to remove additional fruit, collecting the separated out loose fruit and the reshaken fruit and delivering it to a market fruit selection station, and combining market fruit obtained from said culling station with that obtained from said market fruit selection station.

24. The method of claim 23, including the steps of screening the separated out loose fruit, dirt and reshaken fruit to eliminate dirt and undersized fruit from the collection before it is delivered to said market fruit selection station.

25. The method of claim 23, including the steps of turning the mass of vines and fruit over between said shaking steps.

26. The method of claim 23, comprising automatically delivering market fruit from said culling station and automatically discharging culls to the field from said market fruit selection station.

PO-1050
(5/69)

UNITED STATES PATENT OFFICE
CERTIFICATE OF CORRECTION

Patent No. 3,613,796      Dated October 19, 1971

Inventor(s) DAVID W. CAYTON et al

It is certified that error appears in the above-identified patent and that said Letters Patent are hereby corrected as shown below:

Col. 1, line 34, change "3,340935) to --3,340,935--.
Col. 2, line 8, change "marker" to --market--.
Col. 3, line 28, change "s-2" to --S-2--.
Col. 5, line 54, before "FIGS." insert a left parenthesis mark.

Col. 9, line 3, change the numeral "870" to --70--.

Col. 12, line 9, change "fuit" to --fruit--.
Col. 12, line 15, change "vine-mass-receiving receiving" to --vine mass receiving--.

Signed and sealed this 27th day of June 1972.

(SEAL)
Attest:

EDWARD M. FLETCHER, JR.
Attesting Officer

ROBERT GOTTSCHALK
Commissioner of Patents